United States Patent [19]

Evans

[11] Patent Number: 5,032,626

[45] Date of Patent: Jul. 16, 1991

[54] HEAT CURABLE SILICONE COMPOSITIONS

[75] Inventor: Edwin R. Evans, Clifton Park, N.Y.

[73] Assignee: General Electric Company, Waterford, N.Y.

[21] Appl. No.: 361,670

[22] Filed: Jun. 1, 1989

Related U.S. Application Data

[63] Continuation of Ser. No. 5,285, Jan. 16, 1987, abandoned, which is a continuation of Ser. No. 744,847, Jun. 13, 1985, abandoned.

[51] Int. Cl.$^5$ .............................................. C08K 9/00
[52] U.S. Cl. ..................... 523/207; 523/209; 523/213; 524/866; 524/588; 528/24; 528/32
[58] Field of Search ............... 528/24, 32; 523/207, 523/209

[56] References Cited

U.S. PATENT DOCUMENTS

| | | | |
|---|---|---|---|
| 3,652,475 | 3/1972 | Wada et al. | 524/266 |
| 4,355,121 | 10/1982 | Evans | 524/500 |
| 4,525,528 | 6/1985 | Bush et al. | 528/24 |
| 4,529,774 | 7/1985 | Evans et al. | 524/860 |

Primary Examiner—Melvyn I. Marquis

Attorney, Agent, or Firm—Gary L. Loser; John L. Young

[57] ABSTRACT

In a heat curable silicone rubber composition comprising a polydiorganosiloxane base polymer and a curing catalyst, the improvement comprising an effective amount of co-curing agent. Preferably, the co-curing agent has the general formula

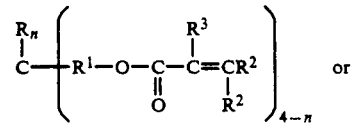

or

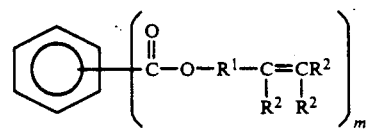

where R is H or a $C_{1-5}$ alkyl radical, $R^1$ is a $C_{1-5}$ alkylene radical, each $R^2$ is independently selected from H and $CH_3$, $R^3$ is H or $CH_3$, n equals 0 or 1, and m is an integer from 3 to 6, inclusive.

15 Claims, No Drawings

HEAT CURABLE SILICONE COMPOSITIONS

This application is a continuation of application Ser. No. 005,285, filed Jan. 16, 1987, now abandoned, which is a continuation of application Ser. No. 744,847, filed June 13, 1985, now abandoned.

BACKGROUND OF THE INVENTION

The present invention relates to heat curable silicone rubber compositions. More particularly, the present invention relates to heat curable silicone rubber compositions containing an amount of certain co-curing agents effective to allow the use of less reinforcing filler while obtaining improved tear strength, suitable durometer and lower compression set. Heat curable silicone rubber compositions comprising (a) a polydiorganosiloxane base polymer, (b) an effective amount of reinforcing filler, and (c) an effective amount of free radical generating catalyst are well known in the art. It is appreciated by those skilled in the art that the amount of reinforcing filler employed is directly related to many of the physical properties of the resultant silicone rubber. For example, if the amount of reinforcing filler in a silicone rubber composition is increased, the durometer, tear strength and compression set will all generally increase somewhat. It is also recognized by those skilled in the art that if the filler loading is too high, the rubber becomes very difficult to process.

For most applications the artisan can obtain suitable properties simply by adjusting the filler level. However, in some applications, such as calendering solvent resistant silicone rubber to fabric, when sufficient filler is added to obtain the necessary durometer, the green strength or bulk modulus of the rubber is detrimental to calendering to fabric since it does not form the desired intimate, void-free compound/fabric interface. Moreover, the filler loading necessary to obtain a suitable durometer also increases the compression set beyond acceptable limits.

It has now been discovered that certain co-curing agents when added to heat curable silicone rubber compositions allow the use of less reinforcing filler while obtaining improved tear strength, substantially unchanged durometer, and lower compression set.

Konkle, U.S. Pat. No. 2,684,957, teaches that low compression set heat curable silicone rubber compositions can be made from (a) an organopolysiloxane, (b) a vulcanizing agent, and (c) from 0.75 to 8 parts by weight per 100 parts by weight of the organopolysiloxane of a cadmium compound selected from cadmium oxide, cadmium peroxide and cadmium carbonate.

Konkle and Talcott, U.S. Pat. No. 2,927,908, relates to the use of polytetrafluoroethylene to improve the tensile strength and tear resistance of fluorinated organopolysiloxane rubber.

Modic, U.S. Pat. No. 2,979,479, discloses that heat curable silicone rubber compositions having improved tear strength can be prepared from (a) an organopolysiloxane, (b) a finely divided silica filler, (c) a curing agent, and (d) a copolymer composed essentially of trimethylsiloxy groups and $SiO_2$ groups, there being present from about 1.0 to 1.5 methyl groups per silicon atom.

Grabicki et al., U.S. Pat. No. 3,027,344, provides heat curable silicone rubber compositions characterized by improved tensile and tear strength comprising (a) an organopolysiloxane, (b) silica filler, (c) 1 to 20 parts of organic amine, and (d) 1 to 20 parts of a hydroxy organosilane selected from diphenylsilanediol and triphenylsilanol.

Wada et al., U.S. Pat. No. 3,652,475, teaches heat curable silicone rubber compositions comprising (a) 100 parts by weight of polydiorganosiloxane having a degree of polymerization of at least 3000 and containing at most 0.3 mole percent vinyl groups, (b) from 1 to 10 parts by weight of polydiorganosiloxane having a degree of polymerization of at least 3000 and containing from 5 to 20 mole percent vinyl groups, (c) from 0.5 to 5 parts by weight of polydiorganosiloxane having a degree of polymerization of from 10 to 1000 and containing from 5 to 90 mole percent vinyl units, (d) 20 to 200 parts by weight of silica filler, and (e) a catalytic amount of organic peroxide; said compositions having improved tear strength and superior compression set.

None of the foregoing references teach or suggest that improved tear strength, acceptable durometer and lower compression set can be obtained by using less reinforcing filler, but including a co-curing agent such as trimethylol propane trimethacrylate or triallyl trimellitate.

SUMMARY OF THE INVENTION

It is an object of the present invention to provide heat curable silicone rubber compositions which permit the use of less reinforcing filler while obtaining improved tear strength, substantially unchanged durometer, and lower compression set.

It is another object of the present invention to provide heat curable silicone rubber compositions suitable for calendering to fabric.

Still another object of the present invention is to provide a method for making the compositions of the present invention.

In accordance with one aspect of the present invention there are provided heat curable silicone rubber compositions, comprising:
(a) a polydiorganosiloxane base polymer;
(b) an effective amount of catalyst; and
(c) an effective amount of co-curing agent.

DESCRIPTION OF THE INVENTION

According to the present invention there are provided heat curable silicone rubber compositions, comprising:
(a) a polydiorganosiloxane base polymer;
(b) an effective amount of catalyst;
(c) an effective amount of co-curing agent; and
(d) optionally, but preferably, an effective amount of reinforcing filler.

Polydiorganosiloxane (a) can be any polymer or mixture of polymers known by those of ordinary skill in the art to be suitable for use in heat curable silicone rubber compositions. Generally, such polydiorganosiloxanes have the general formula

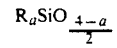

where R is selected from monovalent substituted and unsubstituted organic radicals, a can vary from about 1.95 to about 2.02, inclusive, and the viscosity is at least about 100,000 centipoise at 25° C.

Illustrative of suitable R radicals are aryl radicals and halogenated aryl radicals such as phenyl, chlorophenyl, xylyl, and tolyl; aralkyl radicals such as benzyl and phenylethyl; aliphatic, haloaliphatic and cycloaliphatic radicals such as allkyl, alkenyl, cycloalkyl and haloalkyl, including methyl, ethyl, propyl, vinyl, allyl, cyclohexyl, chloromethyl, chloroethyl and 3,3,3-trifluoropropyl; and cyanoalkyl radicals such as cyanoethyl.

Preferably, R is selected from methyl, vinyl, phenyl and 3,3,3-trifluoropropyl radicals. It is also preferred that the viscosity of polydiorganosiloxane (a) be from about 1,000,000 centipoise to 200,000,000 centipoise at 25° C.

Also within the scope of polydiorganosiloxane (a) are copolymers containing two or more different diorganosiloxane units, such as, for example, copolymers of dimethylsiloxane units and methylphenylsiloxane units; copolymers of dimethylsiloxane units, diphenylsiloxane units, and methylphenylsiloxane units; and copolymers of dimethylsiloxane units, methylvinylsiloxane units and diphenylsiloxane units. There is also included within the scope of polydiorganosiloxane (a) mixtures or blends of polymers and/or copolymers.

If a solvent resistant heat curable silicone rubber is to be prepared, polydiorganosiloxane (a) should be a fluorosilicone polymer, for example, of the type described in U.S. Pat. No. 4,355,121 to Evans, U.S. Pat. No. 4,492,786 to Evans, or U.S. patent application Ser. No. 410,004, filed Aug. 20, 1982, to Evans, now U.S. Pat. No. 4,529,774. Each of the aforesaid Evans patents and patent application are incorporated by reference into the present disclosure. Other suitable fluorosilicone polymers are well known in the art. Such fluorosilicone compositions have been found to be especially suitable for practicing the present invention.

Catalyst (b) can be any of the conventionally used means for promoting curing of the silicone rubber and includes both chemical vulcanizing agents and high energy radiation sources such as gamma radiation from a cobalt-60 source. Preferably, catalyst (b) is one of the organic peroxides commonly used in the silicone art such as 2,4-dichlorobenzoyl peroxide, benzoyl peroxide, di-t-butyl peroxide, 2,5-bis(t-butylperoxy)2,5-dimethylhexane or dicumyl peroxide.

Organic peroxides for use as a catalyst for heat curable silicone rubber are commercially available, usually mixed with an inert carrier to form a powder or paste.

The amount of peroxide used in heat curable silicone rubber compositions is not critical, but generally is from about 0.1 to 5 parts by weight per 100 parts by weight of uncatalyzed silicone polymer. The peroxide catalyst is initiated by heating the composition to a temperature sufficient to activate (e.g. decompose) the organic peroxide used.

Co-curing agent (c) can be any silicone soluble (i.e. somewhat polar) monomer having at least three olefinic functional groups. These monomers are called co-curing agents because they do not initiate curing, however, once curing has begun said co-curing agents rapidly form free radicals, thereby increasing the efficiency of the catalyst and, because they are polyfunctional, take part in establishing a tight cure matrix.

In practicing the present invention it is preferable to include from about 0.1 to about 3 parts by weight of co-curing agent per 100 parts by weight of polydiorganosiloxane (a). More preferably, co-curing agent (c) is utilized in an amount ranging from about 0.2 to about 0.8 parts by weight or, more preferably, from about 0.2 to about 0.4 parts by weight per 100 parts by weight of uncatalyzed silicone polymer.

Generally, the co-curing agents utilized in the practice of the present invention have the general formula

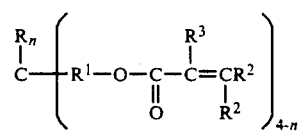

or

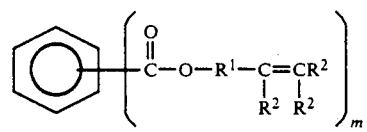

where R is hydrogen or a lower alkyl radical having from 1 to 5 carbon atoms, $R^1$ is a lower alkylene radical having from 1 to 5 carbon atoms, each $R^2$ is independently selected from hydrogen and methyl, $R^3$ is hydrogen or a methyl radical, n equals 0 or 1, and m is an integer from 3 to 6, inclusive. Preferably, R is ethyl, $R^1$ is methylene, $R^2$ is hydrogen, $R^3$ is methyl, n equals 1, and m equals 3. Thus, the preferred co-curing agents of the present invention are trimethylol propane trimethacrylate,

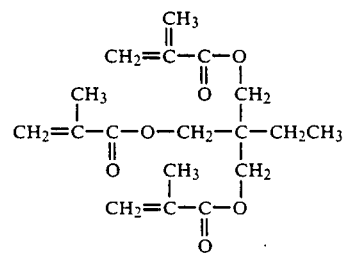

and triallyl trimellitate,

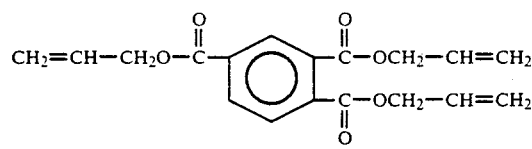

It should be noted that the olefinic functional groups of the co-curing agent need not all be the same and that, in formula II, it is not critical to which carbon of the benzene ring the olefinic functional groups are bonded. Moreover, it should be understood that the foregoing formulas are merely illustrative of suitable co-curing agents and that other variations will be obvious to the artisan and which are included within the scope of the invention as well as the appended claims.

The use of such co-curing agents in heat curable silicone rubber compositions allows the artisan to use less reinforcing filler than heretofore required, yet provides a cured composition having improved tear strength, substantially unchanged durometer, and lower compression set. Furthermore, the use of co-curing agents disclosed hereinabove may allow the artisan to completely eliminate the need for reinforcing filler in some applications. However, it is most preferable that reinforcing filler be included in the heat curable silicone rubber composition, only in a smaller amount.

Illustrative of suitable reinforcing filler (d) are included, for example, fumed silica, treated fumed silica, precipitated silica and treated precipitated silica. Of course, mixtures of such reinforcing fillers are also within the scope of the present invention.

Preferably, the reinforcing filler is a treated silica filler and, most preferably, is treated fumed silica. Treatment of the filler can be effected by any method known in the art, such as, for example, as taught in U.S. Pat. No. 2,938,009 to Lucas, U.S. Pat. No. 3,635,743 to Smith, U.S. Pat. No. 3,837,878 to Beers, or U.S. patent application Ser. No. 410,004, filed Aug. 20, 1982, now U.S. Pat. No. 4,529,774, to Evans, all of which are incorporated herein by reference.

In the case of fluorosilicone heat curable silicone rubbers suitable for calendering to fabric, it is especially preferable to employ the fluorosilicone treated fillers disclosed in Evans, U.S. patent application Ser. No. 410,004, now U.S. Pat. No. 4,529,774. Generally, the amount of reinforcing filler included in the heat curable silicone rubber composition will range from about 5 to about 100 parts by weight and, preferably, from about 30 to 50 parts by weight.

In addition to the ingredients listed above, the heat curable silicone compositions of the present invention may contain additives known in the art, such as antioxidants, pigments, heat stability additives, and the like.

The compositions of the present invention are prepared by mixing the various ingredients in any manner known in the art, for example, in a doughmixer.

In order to better enable the artisan to practice the present invention the following examples are provided by way of illustration and not by way of limitation. All parts are by weight unless otherwise noted.

EXAMPLES

EXAMPLE 1

A base fluorosilicone composition was prepared by mixing 100 parts by weight of methylvinyl terminated polydiorganosiloxane having a viscosity of 100,000,000 centipoise at 25° C.; 3 parts by weight of a polydimethylsiloxane diol process aid having the formula HO—Si(Me)$_2$O—H; 1 part by weight of methylvinyl terminated polydimethylsiloxane process aid; 0.25 parts by weight bis-dimethylvinylsilazane; 0.65 parts by weight curium hydroxide and 0.8 parts by weight 2,5-bis-(t-butyl peroxy)-2,5-dimethylhexane.

4764 grams of this base composition was placed in a 3½ quart doughmixer along with 429 grams of fumed silica treated with fluorosilicone in accordance with U.S. patent application Ser. No. 410,004, filed Aug. 20, 1982, now allowed. The amount of filler was sufficient to provide a filler loading of 40 parts by weight.

After effecting uniform dispersion of the filler, 47.7 grams red colorant and amounts of trimethylol propane trimethacrylate (available as Sartomer 350 from Sartomer Company, West Chester, Pa.) ranging from 0.25 to 2.0 parts by weight of polymer was added (see Table I). The ingredients were thoroughly mixed for 30 minutes and then strained through a 100 mesh 316 SS screen. The strained compound was then catalyzed on a mill with 2,4-dichlorobenzoyl peroxide (50 weight percent in SF-96 ®1000 centistoke fluid containing 12.5 weight percent dibutylphthalate) at a level of 1.6 parts by weight per 100 parts by weight of compound. See Table I, compositions B, C, E, F and G.

EXAMPLE 2

The same procedure as in Example 1 was followed except that the trimethylol propane trimethacrylate was replaced with 0.25 parts triallyl trimellitate per 100 parts by weight of polymer. See Table I, composition D.

EXAMPLE 3

For purposes of comparison, FSE-7140, available from General Electric Company, was evaluated since it is an example of a composition that is ineffective for calendering to fabric. Also for purposes of comparison there was prepared a composition as in Example 1 except the co-curing agent was not included. See Table I, Composition A. Lastly, a composition manufactured by Dow Corning Corporation (LS-63) and believed to be used for calendering to fabric was also tested.

TABLE I

|  | FSE 7140 | A | B | C | D | E | F | G | LS-63 |
|---|---|---|---|---|---|---|---|---|---|
| Base Compound | 100 | 100 | 100 | 100 | 100 | 100 | 100 | 100 | UNKNOWN |
| Total Filler Level | 28 | 46 | 46 | 40 | 40 | 39 | 40 | 40 |  |
| Trimethylol propane trimethacrylate | — | — | 0.25 | 0.25 | — | 0.30 | 0.25 | 2.0 |  |
| Triallyl trimelliate | — | — | — | — | 0.25 | — | — | — |  |
| Peroxide/100 pt. cpd. | 1.6 | 1.6 | 1.6 | 1.6 | 1.6 | 1.6 | 1.6 | 1.6 |  |
| Post Cure 15 min/350° F., Post Bake 4 hrs/400° F. |  |  |  |  |  |  |  |  |  |
| Physical Properties |  |  |  |  |  |  |  |  |  |
| Shore A | 46 | 61 | 66 | 64 | 61 | 60 | 62 | 68 | 62 |
| Tensile, psi | 1395 | 1485 | 1285 | 1440 | 1150 | 1460 | 1455 | 1210 | 1163 |
| Elongation, % | 400 | 330 | 320 | 330 | 410 | 430 | 380 | 460 | 240 |
| Tear, Die B, pi | 140 | 145 | 190 | 165 | 190 | 175 | 160 | 190 | 115 |
| Specific gravity | 1.42 | 1.45 | 1.46 | 1.45 | 1.46 | 1.45 | 1.45 | 1.43 | 1.48 |
| Comprsssion Set B 22 hrs/350° F. | 27.9 | 29.1 | 28.0 | 23.0 | 21.0 | 12.2 | 17.7 | 16.3 | 14.9 |
| Fuel Immersion - Fuel B (22 hours, room temperature) |  |  |  |  |  |  |  |  |  |
| % Vol. Change | 24.5 | 29.0 | 29.0 | 22.1 | 22.8 | 23 | 23 | 24.9 | 24.8 |
| Calender Performance | Exc. | Some Voids | No Good | Good | Exc. | Exc. | Exc. | Exc. | Good |

The data in Table I clearly shows the superior performance of compositions C through G, relative to A and LS-63, which are prepared with lower filler loadings and the co-curing agents of the present invention. The silicone elastomers prepared therefrom have a substantially unchanged durometer (relative to A) and exhibit better resistance to tear, compression set and fuel B solvent swell while maintaining good processability.

I claim:

1. A heat curable silicone rubber composition, comprising:
   (a) a polydiorganosiloxane base polymer having the general formula:

wherein R is selected from monovalent substituted or unsubstituted organic radicals, a varies from about 1.95 to about 2.02, inclusive, and the viscosity is at least about 100,000 centipoise at 25° C;
   (b) an effective amount of catalyst to promote curing;
   (c) from 0.2 to 0.4 parts by weight of co-curing agent per 100 parts by weight polydiorganosiloxane (a), said co-curing agent comprising a silicone soluble monomer having at least three olefinic functional groups to improve tear strength and lower compression set; and
   (d) reinforcing filler in an amount from 5 to 40 parts by weight silica per 100 parts by weight said polydiorganosiloxane (a).

2. A composition as in claim 1, wherein the co-curing agent has the general formula

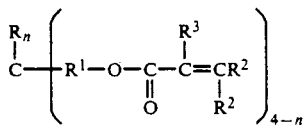

where R is hydrogen or a lower alkyl radical having from 1 to 5 carbon atoms, $R^1$ is a lower alkylene radical having from 1 to 5 carbon atoms, $R^2$ is hydrogen or a methyl radical, $R^3$ is hydrogen or a methyl radical, and n equals 0 or 1.

3. A composition as in claim 2, wherein the co-curing agent is trimethylol propane trimethacrylate.

4. A composition as in claim 1, wherein the co-curing agent has the general formula

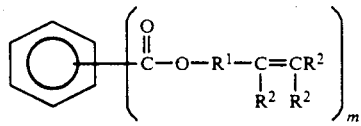

where $R^1$ is a lower alkylene radical having from 1 to 5 carbon atoms, each $R^2$ is independently selected from hydrogen and methyl, and m is an integer from 3 6, inclusive.

5. A composition as in claim 4, wherein the co-curing agent is triallyl trimellitate.

6. A heat curable silicone rubber composition, comprising:
   (a) 100 parts by weight of polydiorganosiloxane base polymer having the general formula:

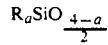

where R is selected from monovalent substituted or unsubstituted organic radicals, a varies from about 1.95 to about 2.02, inclusive, and the viscosity is at least about 100,000 centipoise at 25° C.;
   (b) from 0.1 to 5 parts by weight of organic peroxide catalyst,
   (c) from 5 to 40 parts by weight of reinforcing filler, and
   (d) from 0.2 to 0.4 parts by weight of co-curing agent per 100 parts by weight of polydiorganosiloxane (a) to improve tear strength and lower compression set, said co-curing agent selected from compounds having the general formula:

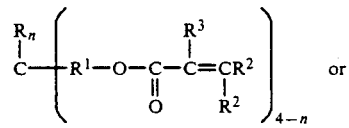

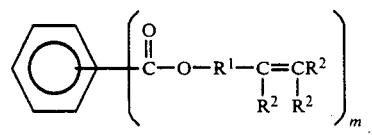

where R is hydrogen or a lower alkyl radical having from 1 to 5 carbon atoms, $R^1$ is a lower alkylene radical having from 1 to 5 carbon atoms, each $R^2$ is independently selected from hydrogen or methyl, $R^3$ is hydrogen or methyl, n equals 0 or 1, and m is an integer from 3 to 6, inclusive.

7. A composition as in claim 6, wherein polydiorganosiloxane (a) is a fluorosilicone polymer and reinforcing filler (d) is fluorosilicone treated fumed silica present in an amount ranging from 30 to 50 parts by weight per 100 parts by weight of polydiorganosiloxane (a).

8. The cured composition of claim 1.

9. A method for making a heat curable silicone rubber composition, comprising mixing:
   (a) a polydiorganosiloxane base polymer having the general formula:

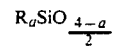

where R is selected from monovalent substituted or unsubstituted organic radicals, a varies from about 1.95 to about 2.02, inclusive, and the viscosity is at least about 100,000 centipoise at 25° C.;
   (b) an effective amount of catalyst to promote curing;
   (c) from 0.2 to 0.4 parts by weight of co-curing agent per 100 parts by weight polydiorganosiloxane (a), said co-curing agent comprising a silicone soluble monomer having at least three olefinic functional groups to improve tear strength and lower compression set; and
   (d) reinforcing filler in an amount from 5 to 40 parts by weight silica per 100 parts by weight said polydiorganosiloxane (a).

10. A method as in claim 9, wherein the co-curing agent has the general formula

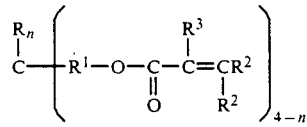

where R is hydrogen or a lower alkyl radical having from 1 to 5 carbon atoms, $R^1$ is a lower alkylene radical having from 1 to 5 carbon atoms, $R^2$ is hydrogen or a methyl radical, $R^3$ is hydrogen or a methyl radical, and n equals 0 or 1.

11. A method as in claim 10, wherein the co-curing agent is trimethylol propane trimethacrylate.

12. A method as in claim 9, wherein the co-curing agent has the general formula

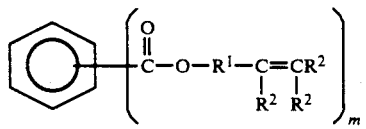

where $R^1$ is a lower alkylene radical having from 1 to 5 carbon atoms, each $R^2$ is independently selected from hydrogen or methyl, and m is an integer from 3 to 6, inclusive.

13. A method as in claim 12, wherein the co-curing agent is triallyl trimellitate.

14. A method for making a heat curable silicone rubber composition, comprising mixing:
(a) 100 parts by weight of polydiorganosiloxane base polymer having the general formula:

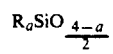

where R is selected from monovalent substituted or unsubstituted organic radicals, a varies from about 1.95 to about 2.02, inclusive, and the viscosity is at least about 100,000 centipoise at 25° C.;

(b) from 0.1 to 5 parts by weight of organic peroxide catalyst,
(c) from 5 to 40 parts by weight of reinforcing filler, and
(d) from 0.2 to 0.4 parts by weight of co-curing agent per 100 parts by weight of polydiorganosiloxane (a) to improve tear strength and lower compression set, said co-curing agent selected from compounds having the general formula:

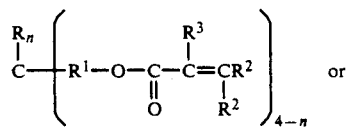 or

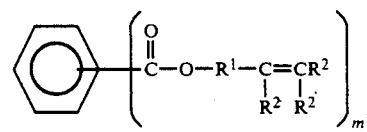

where R is hydrogen or a lower alkyl radical having from 1 to 5 carbon atoms, $R^1$ is a lower alkylene radical having from 1 to 5 carbon atoms, each $R^2$ is independently selected from hydrogen or methyl, $R^3$ is hydrogen or methyl, n equals 0 or 1, and m is an integer from 3 to 6, inclusive.

15. A method as in claim 14, wherein polydiorganosiloxane (a) is a fluorosilicone polymer and reinforcing filler (d) is fluorosilicone treated fumed silica present in an amount ranging from about 30 to 40 parts by weight per 100 parts by weight of polydiorganosiloxane (a).

* * * * *